United States Patent
Shim

(10) Patent No.: US 12,155,099 B2
(45) Date of Patent: Nov. 26, 2024

(54) EJECTOR HAVING TWO-STAGE NOZZLE STRUCTURE

(71) Applicants: Hyundai Motor Company, Seoul (KR); Kia Corporation, Seoul (KR)

(72) Inventor: Hyo Sub Shim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 70 days.

(21) Appl. No.: 17/682,496

(22) Filed: Feb. 28, 2022

(65) Prior Publication Data

US 2022/0416272 A1    Dec. 29, 2022

(30) Foreign Application Priority Data

Jun. 24, 2021    (KR) ........................ 10-2021-0082184

(51) Int. Cl.
*H01M 8/04082*    (2016.01)
*F04F 5/46*    (2006.01)

(52) U.S. Cl.
CPC ......... *H01M 8/04216* (2013.01); *F04F 5/461* (2013.01)

(58) Field of Classification Search
CPC ......... H01M 8/04216; H01M 8/04097; H01M 8/04082–04223; F04F 5/461; Y02E 60/50
See application file for complete search history.

(56) References Cited

U.S. PATENT DOCUMENTS

| | | | | |
|---|---|---|---|---|
| 5,685,492 | A | * 11/1997 | Davis | F02M 61/08 239/584 |
| 2014/0292234 | A1 | * 10/2014 | Nishida | B60L 50/70 429/9 |
| 2015/0333339 | A1 | * 11/2015 | Noh | H01M 8/04097 239/583 |

FOREIGN PATENT DOCUMENTS

| | | |
|---|---|---|
| JP | 2020-56365 A | 4/2020 |
| KR | 102453338 * | 8/2015 |
| KR | 101583931 B1 | 1/2016 |

OTHER PUBLICATIONS

Machine translation of KR102453338, accessed Jun. 14, 2023 (Year: 2023).*

* cited by examiner

*Primary Examiner* — Milton I Cano
*Assistant Examiner* — Albert Michael Hilton
(74) *Attorney, Agent, or Firm* — Fox Rothschild LLP

(57) ABSTRACT

An ejector has a two-stage nozzle structure. The ejector is installed on a fuel cell recirculation line to supply new hydrogen and a recirculation gas. The ejector includes a housing having a first orifice defined therein and a poppet that is disposed in the housing and having a second orifice defined therein. A damage prevention member is disposed on a surface of the poppet to contact an inner surface of the housing, in which the damage prevention member contacts or is separated from the inner surface of the housing based on a pressure applied to the poppet.

11 Claims, 3 Drawing Sheets

EJECTOR HAVING TWO-STAGE NOZZLE STRUCTURE

CROSS-REFERENCE TO RELATED APPLICATION

This application claims under 35 U.S.C. § 119(a) the benefit of priority to Korean Patent Application No. 10-2021-0082184 filed on Jun. 24, 2021, the entire contents of which are incorporated herein by reference.

BACKGROUND

(a) Technical Field

The present disclosure relates to an ejector having a two-stage nozzle structure installed on a fuel cell recirculation line to supply new hydrogen and a recirculation gas.

(b) Background Art

A hydrogen supply system is a device configured to receive high-pressure hydrogen from a hydrogen tank to be reduced to a pressure required by a fuel cell stank to supply hydrogen. A main function of the hydrogen supply system is to sufficiently supply the hydrogen required by the fuel cell stack, to recirculate non-reaction hydrogen, and to remove impurities in the fuel cell stack to increase the purity of the hydrogen. The hydrogen supply system should supply a particular amount of hydrogen or more that corresponds to the maximum output to generate the maximum output required by the fuel cell stack and recirculate the unreacted gas using a recirculation component, such as a blower or an ejector, to recirculate unreacted gas.

A blower may be used to recirculate the hydrogen, but the blower is a motor based component, and an actuator is expensive and a bearing or other components of the blower are highly likely to erode by condensate of a recirculation gas. When using an ejector instead of the blower, the technology may be simplified to implement the recirculation of hydrogen. A method for increasing the pressure at the upstream end of the ejector or a method using two ejectors has been used to secure recirculation performance in a low output section and to secure the maximum supply performance in a high output section. However, a method for increasing the pressure at a hydrogen supply terminal has difficulty in securing airtightness ability and resistance to pressure performance at the hydrogen supply terminal. In the method using two ejectors, the size of the hydrogen supply system disadvantageously increases.

The above information disclosed in this section is merely for enhancement of understanding of the background of the disclosure and accordingly it may include information that does not form the prior art that is already known in this country to a person of ordinary skill in the art.

SUMMARY OF THE DISCLOSURE

An object of the present disclosure is to provide an ejector having a two-stage nozzle structure in which a flow path through which hydrogen flows varies based on an output section for supplying the hydrogen. Another object of the present disclosure is to provide an ejector having a two-stage nozzle structure in which an additional flow path for supplying hydrogen in a high-output section is formed.

An ejector having a two-stage nozzle structure is provided according to an exemplary embodiment of the present disclosure. An ejector having a two-stage nozzle structure installed on a fuel cell recirculation line to supply new hydrogen and a recirculation gas may include a housing having a first orifice defined therein and a poppet disposed in the housing and having a second orifice defined therein, in which the poppet is moved by a pressure of the hydrogen supplied to the housing and a space between the poppet and the housing serves as a flow path through which the hydrogen is supplied.

According to an exemplary embodiment, the ejector having the two-stage nozzle structure may include a damage prevention member disposed on a surface of the poppet to contact an inner surface of the housing, in which the damage prevention member contacts or is separated from the inner surface of the housing based on a pressure applied to the poppet. According to the exemplary embodiment, the ejector having the two-stage nozzle structure may further include a spring disposed to surround the surface of the poppet, in which the poppet is moved by the spring based on the pressure applied to the poppet, and the damage prevention member contacts or is separated from the inner surface of the housing based on the movement of the poppet.

An inner space of the housing may be divided into a first space and a second space, and the poppet may be divided into a first region disposed in the first space and a second region disposed in the second space. The first region may be connected to the second region, and may be formed in a shape in which a cross-sectional area thereof increases as a distance from the second region increases.

Additionally, the first region may be divided into a first portion extending from the second region and a second portion having a surface facing the first orifice, and a part of an inner surface of the first space of the housing is formed of a surface parallel to a surface of the first portion. A protrusion that divides the first space and the second space may be disposed on the inner surface of the housing, and the first region of the poppet may be positioned only in the first space by the protrusion.

A diameter of a space opened by the protrusion may be less than the greatest diameter of the diameter of the cross-sectional area of the first region. The ejector having the two-stage nozzle structure may further include a damage prevention member disposed on a surface of the poppet to contact the inner surface of the housing, in which a pressure applied to the poppet is increased as an output for supplying the hydrogen is increased, and the damage prevention member is separated from the inner surface of the housing as the pressure applied to the poppet is increased.

According to the exemplary embodiment, if the damage prevention member contacts the inner surface of the housing, the hydrogen is discharged through the first orifice by passing through the second orifice. Further, if the damage prevention member is separated from the inner surface of the housing, the hydrogen is discharged into the second orifice and a space between the housing and the poppet, and discharged through the first orifice.

Additionally, a guide member that guides a position of the poppet in the housing may be provided on a surface of the poppet. The second orifice may be defined to penetrate the poppet in a direction in which the hydrogen is provided. A first diameter of a space opened by the first orifice may be greater than a second diameter of a space opened by the second orifice. The ejector having the two-stage nozzle structure may further include a spring disposed to surround a surface of the poppet, a protrusion protruding from the inner surface of the housing, and a guide member disposed on the surface of the poppet to guide a position of the poppet in the housing, in which the spring is disposed between the protrusion and the guide member.

According to the exemplary embodiment of the present disclosure, an amount by which the poppet is moved toward the first orifice may be minimal in the low-output section (e.g., section where the pressure applied to the poppet is relatively small). Therefore, it is possible to maintain the state where the damage prevention member is attached to the inner surface of the housing. At this time, the compressed hydrogen may flow only through the second orifice having a smaller diameter, and therefore, the flow rate of the hydrogen supplied may be increased. It is possible to improve the performance in which the ejector suctions the gas not reacted in the fuel cell stack due to the increase in the amount of discharge of hydrogen according to the increase in the flow rate of the hydrogen.

According to the exemplary embodiment of the present disclosure, the additional flow path is required such that the flow volume supplying hydrogen is sufficient in the high-output section. Therefore, the space between the housing and the poppet may serve as the flow path through which the hydrogen flows based on the output section, thereby securing the flow volume of the hydrogen supply. Further, in the high-output section, the damage prevention member may be separated from the inner surface of the housing and therefore, the space between the housing and the poppet may serve as the flow path through which the hydrogen flows. In other words, responsiveness may be faster in discharging the hydrogen.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the disclosure are discussed infra.

BRIEF DESCRIPTION OF THE DRAWINGS

The above and other features of the present disclosure will now be described in detail with reference to certain exemplary examples thereof illustrated in the accompanying drawings which are given herein below by way of illustration only, and thus are not limitative of the present disclosure, and wherein.

Figure 1:
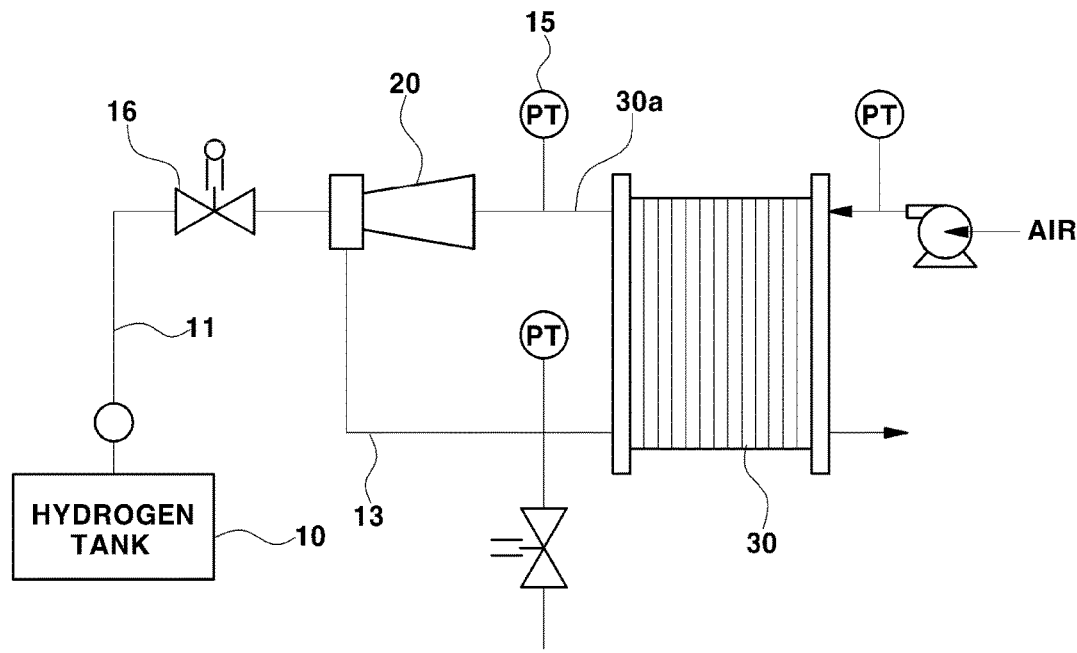
FIG. 1 is a diagram illustrating a basic configuration of a fuel cell supply and recirculation system in a fuel cell system.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Advantages and features of the present disclosure, and a method for achieving them will become apparent with reference to the embodiments described below in detail in conjunction with the accompanying drawings. However, the present disclosure is not limited to the embodiments disclosed below but may be implemented in various different forms, and only the present embodiment serves to complete the disclosure of the present disclosure, and to fully inform those skilled in the art to which the present disclosure pertains of the scope of the disclosure, and the present disclosure is only defined by the scope of the claims. Throughout the specification, the same reference numerals refer to the same components.

In the present specification, the reason why the names of the components are divided into the first, the second, etc. is to distinguish the names of the components having the same relationship, and the following description is not necessarily limited to the order thereof.

The detailed description is illustrative of the present disclosure. Further, the above description shows and describes a preferred embodiment of the present disclosure, and the present disclosure may be used in various other combinations, modifications, and environments. That is, changes or modifications are possible within the scope of the concept of the disclosure disclosed in the present specification, the scope equivalent to the described disclosure, and/or within the scope of the technology or the knowledge in the art. The described embodiment describes the best mode for implementing the technical spirit of the present disclosure, and various changes required in specific application fields and uses of the present disclosure are possible. Therefore, the detailed description of the disclosure is not intended to limit the present disclosure to the disclosed embodiments. Further, the appended claims should be construed to also include other embodiments.

FIG. 1 is a diagram illustrating a basic configuration of a fuel cell supply and recirculation system in a fuel cell system.

Referring to FIG. 1, a hydrogen supply system may perform a fuel supply process of supplying hydrogen to a fuel cell stack 30 and a process of recirculating the hydrogen not reacted in the fuel cell stack 30. The hydrogen supply system may include a hydrogen supply line 11 connected to a hydrogen storage tank 10, a hydrogen recirculation line 13 through which the hydrogen not reacted in the fuel cell stack 30 is recirculated, an ejector 20 mounted on a point where a stack inlet 30*a* and the hydrogen recirculation line 13 meet such that new hydrogen and recirculation hydrogen are pumped and supplied to an anode of the fuel cell stack 30, a stack inlet side pressure sensor 15 mounted on the stack inlet 30*a* to measure hydrogen and air pressure, and a regulator 16 mounted on the hydrogen supply line 11.

The ejector 20 may receive hydrogen primarily decompressed by a high-pressure regulator 16, generate vacuum by spraying the supplied compressed hydrogen through a nozzle, and suction a discharge gas within the fuel cell stack 30 using the vacuum to recirculate a hydrogen gas. In other words, the ejector 20 may provide all of the newly supplied hydrogen and the hydrogen not reacted in the fuel cell stack 30 to the fuel cell stack 30. The ejector 20 may spray jet through the nozzle using a pressure at a downstream end of the high-pressure regulator 16 to supply a fuel and at the same time, generate a momentum necessary for recirculation. A detailed configuration of the ejector 20 will be described later.

Figure 2:
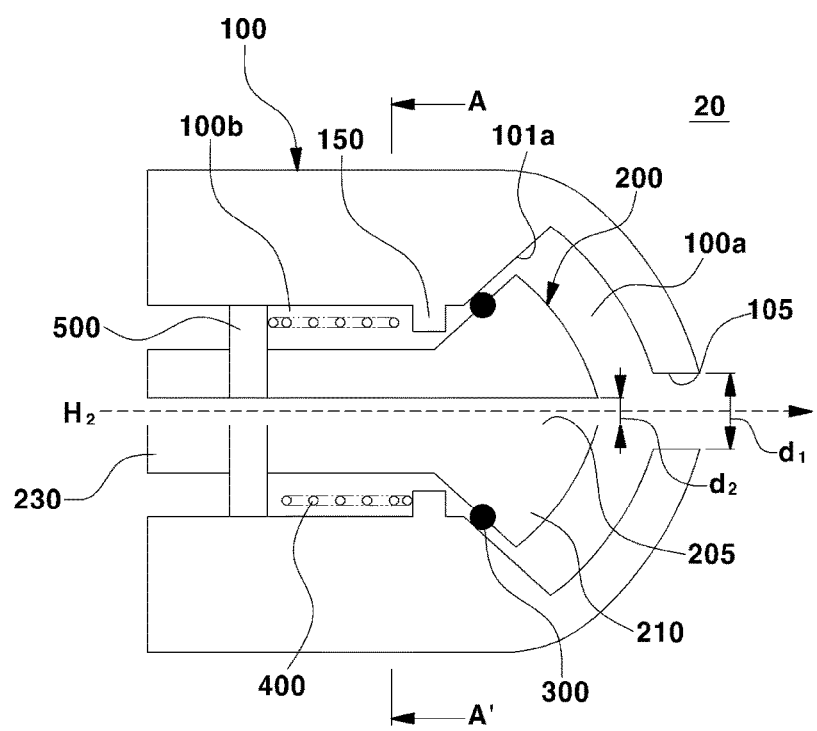
FIG. 2 is a diagram illustrating an ejector having a two stage nozzle structure according to an exemplary embodiment of the present disclosure.
Figure 3:
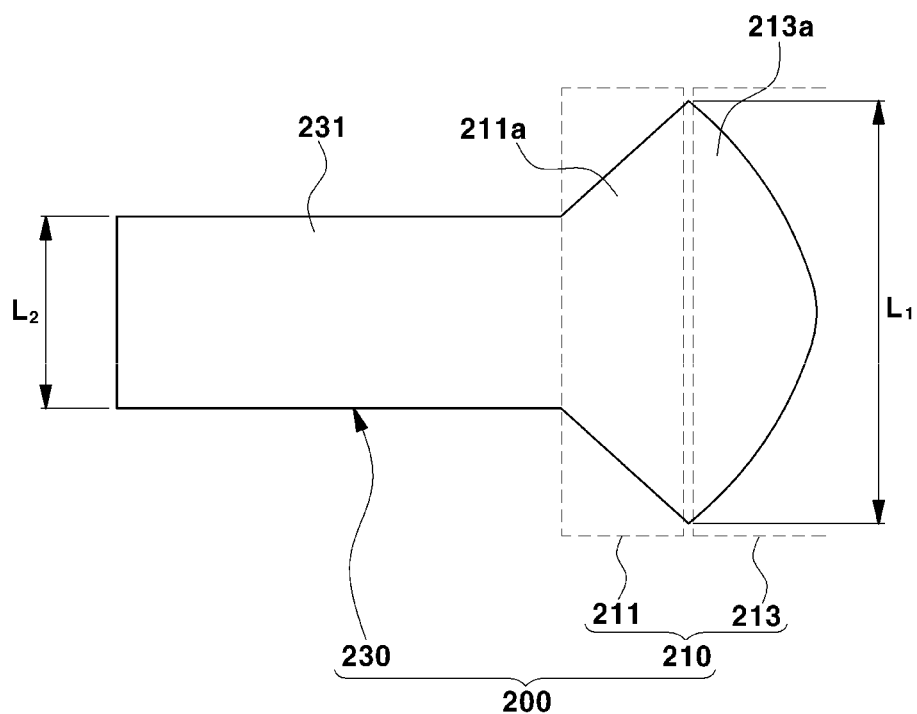
FIG. 3 is a diagram illustrating a poppet of FIG. 2.

FIG. 2 is a diagram illustrating an ejector having a two stage nozzle structure according to an exemplary embodiment of the present disclosure, and FIG. 3 is a diagram illustrating a poppet of FIG. 2. FIG. 2 is a diagram illustrating a state of the ejector when hydrogen is discharged in a low-output section.

Referring to FIGS. 2 and 3, the ejector 20 may include a housing 100, a poppet 200, a damage prevention member 300, a spring 400, and a guide member 500. The ejector 20 may have a two-stage nozzle structure including a first orifice 105 defined in the housing 100 and a second orifice 205 defined in the poppet 200. The housing 100 may be a component that defines an appearance of the ejector 20. The poppet 200, the damage prevention member 300, the spring 400, and the guide member 500 may be disposed in the housing 100. An inner space of the housing 100 may be divided into a first space 100a and a second space 100b. The first orifice 105 provided on one end of the housing 100 may be an open space defined as a first diameter ($d_1$). The hydrogen may be discharged through the first orifice 105.

The poppet 200 may be disposed in the housing 100. The second orifice 205 defined at a position corresponding to the first orifice 105 may be defined in the poppet 200. The second orifice 205 may penetrate the poppet 200 in a direction in which hydrogen is provided. In other words, the open space defined by each of the first orifice 105 and the second orifice 205 may overlap in a horizontal direction in the drawing. In other words, the positions of the first orifice 105 and the second orifice 205 may correspond to each other in the horizontal direction in the drawing. The second orifice 205 may be an open space defined as a second diameter ($d_2$). The second diameter ($d_2$) may be less than the first diameter ($d_1$). Since the hydrogen is discharged through the second orifice 205 having a small cross-sectional area, a flow rate of the hydrogen may be increased, thereby securing performance of suctioning the hydrogen in a low flow volume region.

The poppet 200 may be divided into a first region 210 disposed in the first space 100a and a second region 230 disposed in a second space 100b. The first region 210 may be connected to the second region 230, and may be formed in a shape in which a cross-sectional area is increased as the distance from the second region 230 increases. Specifically, the first region 210 may be divided into a first portion 211 extending from the second region 230 and a second portion 213 having a surface 213a facing the first orifice 105. A diameter (L2) of the cross-sectional area of the second region 230 may be less than the maximum diameter (L1) of the cross-sectional area of the first region 210. The maximum diameter (L1) of the cross-sectional area of the first region 210 may indicate the diameter of the cross-sectional area at a point where the first portion 211 and the second portion 213 are connected. A surface 211a of the first portion 211 may be formed of a surface parallel to a part 101a of an inner surface of the first space 100a of the housing 100. In other words, the part 101a of the inner surface of the first space 100a may be formed in a shape corresponding to the surface 211a of the first portion 211 whose cross-sectional area increases as the distance from the second region 230 increases. The second portion 213 may be formed in a shape in which the cross-sectional area thereof decreases toward the first orifice 105. The second orifice 205 may be defined on the tip of the second portion 213.

A protrusion 150 that divides the first space 100a and the second space 100b may be disposed on the inner surface of the housing 100. Specifically, a space between the protrusion 150 and the first orifice 105 may be defined as the first space 100a, and the other space may be defined as the second space 100b. The protrusion 150 may be disposed at a position adjacent to a boundary point between the first space 100a and the second space 100b. The protrusion 150 may be disposed between the damage prevention member 300 and the spring 400. The protrusion 150 may be continuously formed on the inner surface of the housing 100. In other words, the protrusion 150 may be continuously formed in a circumferential direction of a circle around a direction in which hydrogen is supplied. Therefore, a diameter of the space opened by the protrusion 150 may be less than the diameter of the space defined by the first space 100a. Further, the diameter of the space opened by the protrusion 150 may be less than the greatest diameter (L1) of the diameter of the cross-sectional area of the first region 210. Therefore, the first region 210 of the poppet 200 may be latched or fastened by the protrusion 150, and the first region 210 may be positioned only in the first space 100a.

The damage prevention member 300 may be disposed on a surface of the poppet 200 to contact the inner surface of the housing 100. Specifically, the damage prevention member 300 may be disposed on a surface of the first portion 211 of the first region 210 of the poppet 200. The damage prevention member 300 may contact or be separated from the inner surface of the first space 100a of the housing 100 based on a pressure applied to the poppet 200. The pressure applied to the poppet 200 may vary based on the section where the hydrogen is output. For example, the damage prevention member 300 may be made of an elastic material. Therefore, the damage prevention member 300 may prevent the housing 100 or the poppet 200 from being damaged as the poppet 200 directly contacts the inner surface of the housing 100.

The spring 400 may be disposed to surround the surface of the poppet 200. The spring 400 may be disposed to surround a surface 231 of the second region 230 of the poppet 200. In addition, the spring 400 may be disposed in a space between the protrusion 150 and the guide member 500. A first end of the spring 400 may contact the protrusion 150, and a second end of the spring 400 may contact the guide member 500. The poppet 200 may be moved by the spring 400 based on the pressure applied to the poppet 200, and the damage prevention member 300 may contact or be separated from the inner surface of the housing 100 based on the movement of the poppet 200. In other words, the spring 400 may move the poppet 200 based on the pressure applied to the poppet 200.

The guide member 500 may guide the position of the poppet 200 in the inner space of the housing 100. The poppet 200 may be ideally disposed on a center portion of the inner space of the housing 100. Therefore, the guide member 500 may be disposed on a surface of the second region 230 of the poppet 200 to guide the position of the poppet 200.

An amount of the poppet 200 moved toward the first orifice 105 may be minimal in the low-output section (e.g., section where the pressure applied to the poppet 200 is relatively small). Therefore, a state where the damage prevention member 300 is attached to the inner surface of the housing 100 may be maintained. At this time, the compressed hydrogen supplied to the second space 100b of the housing 100 may flow only through the second orifice 205, and the compressed hydrogen passing through the second orifice 205 may be discharged through the first orifice 105. As the hydrogen is discharged only through the second orifice 205 having the small diameter in the low-output section, the flow rate of the supplied hydrogen may be increased, thereby improving the performance in which the ejector 20 suctions the gas not reacted in the fuel cell stack due to the increase in the amount of hydrogen discharged.

Figure 4:
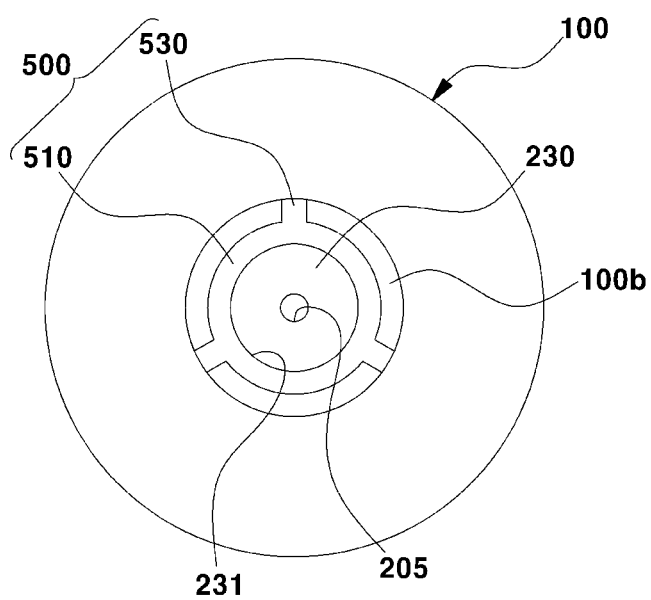
FIG. 4 is a diagram illustrating a cut surface taken along line A-A' of FIG. 2.

FIG. 4 is a diagram illustrating a cut surface taken along line A-A' of FIG. 2.

Referring to FIGS. 2 and 4, the second region 230 of the poppet 200 and the guide member 500 may be disposed in the second space 100b of the housing 100. The guide member 500 may be disposed to surround the surface 231 of the second region 230. The guide member 500 may include a body portion 510 with a ring shape and an extension 530 extending from the body portion 510 toward the inner surface of the second space 100b. In particular, a plurality of extensions 530 may extend from the body portion 510. The second region 230 of the poppet 200 may be disposed on the center in the inner space of the housing 100 by the extension 530.

The hydrogen may flow into the space between the second region 230 of the poppet 200 and the housing 100. The hydrogen may flow into the space between the second region 230 of the poppet 200 and the housing 100 in both the low-output section and the high-output section. However, the hydrogen may not pass through the first orifice 105 through the space between the second region 230 of the poppet 200 and the housing 100 by the damage prevention member 300 in the low-output section. However, the pressure of the hydrogen in the space between the second region 230 of the poppet 200 and the housing 100 is greater than a predetermined pressure in the high-output section to move the poppet 200 toward the first orifice 105, and therefore, the hydrogen may pass through the first orifice 105 since the damage prevention member 300 does not contact the inner surface of the housing 100. In other words, in the high-output section, the space between the second region 230 of the poppet 200 and the housing 100 may serve as the flow path through which the hydrogen flows based on the section where the hydrogen is output.

Figure 5:
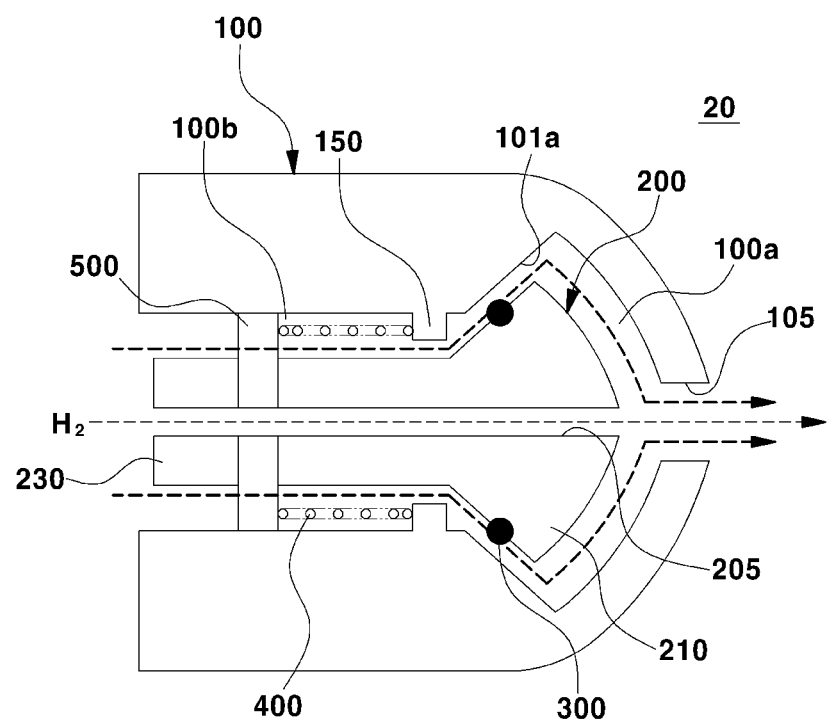
FIG. 5 is a diagram illustrating an ejector having a two-stage nozzle structure according to another exemplary embodiment of the present disclosure.

FIG. 5 is a diagram illustrating an ejector having a two-stage nozzle structure according to another exemplary embodiment of the present disclosure. FIG. 5 is a diagram illustrating a state of the ejector when the hydrogen is discharged in the high-output section. A description of overlapped contents will be omitted for simplifying the description.

Referring to FIG. 5, as an output for supplying hydrogen is increased (i.e., high-output section), the pressure applied to the poppet 200 increases, and as the pressure applied to the poppet 200 increases, the damage prevention member 300 may be separated from the inner surface of the housing 100. If the damage prevention member 300 is separated from the inner surface of the housing 100, the hydrogen may be discharged into the second orifice 205 and the space between the housing 100 and the poppet 200, and finally discharged through the first orifice 105.

According to the exemplary embodiment of the present disclosure, an additional flow path is required such that the flow volume supplying hydrogen is sufficient in the high-output section. Therefore, the space between the housing 100 and the poppet 200 may serve as the flow path through which the hydrogen flows based on the output section, thereby securing the flow volume of the hydrogen supply. Further, the damage prevention member 300 is separated from the inner surface of the housing 100 in the high-output section, and therefore, the space between the housing 100 and the poppet 200 may serve as the flow path through which the hydrogen flows. In other words, responsiveness may be faster in discharging the hydrogen.

As described above, while the exemplary embodiments of the present disclosure have been described with reference to the accompanying drawings, it may be understood by those skilled in the art to which the present disclosure pertains that the present disclosure may be carried out in various specific forms without changing the technical spirit or the essential features thereof. Therefore, it should be understood that the aforementioned exemplary embodiments are illustrative and not restrictive in all respects.

What is claimed is:

1. An ejector having a two-stage nozzle structure installed on a fuel cell recirculation line to supply new hydrogen and a recirculation gas, comprising:

a housing having a first orifice defined therein and an inner space divided into a first space and a second space;

a poppet disposed in the housing and having a second orifice defined therein, wherein the poppet is divided into a first region disposed in the first space and a second region disposed in the second space; and a damage prevention member disposed on a surface of the poppet to contact an inner surface of the housing, wherein the damage prevention member is disposed on the first region and a diameter of a cross-sectional area of the first region where the damage prevention member is disposed is greater than a diameter of a cross-sectional area of the second region, wherein the poppet is moved by a pressure of hydrogen supplied to the housing and a space between the poppet and the housing serves as a flow path through which the hydrogen is supplied, wherein a pressure applied to the poppet is increased as an output for supplying the hydrogen is increased, and wherein the damage prevention member is separated from the inner surface of the housing as the pressure applied to the poppet is increased, wherein the first region is connected to the second region, and is formed in a shape in which a cross-sectional area thereof increases as a distance from the second region increases.

2. The ejector having the two-stage nozzle structure of claim 1, further comprising:

a spring disposed to surround the surface of the poppet, wherein the poppet is moved by the spring based on the pressure applied to the poppet, and the damage prevention member contacts or is separated from the inner surface of the housing based on the movement of the poppet.

3. The ejector having the two-stage nozzle structure of claim 1, wherein the first region is divided into a first portion extending from the second region and a second portion having a surface facing the first orifice, and wherein a part of an inner surface of the first space of the housing is formed of a surface parallel to a surface of the first portion.

4. The ejector having the two-stage nozzle structure of claim 1, wherein a protrusion that divides the first space and the second space is disposed on the inner surface of the housing, and wherein the first region of the poppet is positioned only in the first space by the protrusion.

5. The ejector having the two-stage nozzle structure of claim 4,
wherein a diameter of a space opened by the protrusion is less than the greatest diameter of the cross-sectional area of the first region.

6. The ejector having the two-stage nozzle structure of claim 1,
wherein the hydrogen is discharged through the first orifice by passing through the second orifice as the damage prevention member contacts the inner surface of the housing.

7. The ejector having the two-stage nozzle structure of claim 1,
wherein the hydrogen is discharged into the second orifice and a space between the housing and the poppet, and discharged through the first orifice as the damage prevention member is separated from the inner surface of the housing.

8. The ejector having the two-stage nozzle structure of claim 1,
wherein a guide member that guides a position of the poppet in the housing is provided on a surface of the poppet.

9. The ejector having the two-stage nozzle structure of claim 1,
wherein the second orifice is defined to penetrate the poppet in a direction in which the hydrogen is provided.

10. The ejector having the two-stage nozzle structure of claim 1,
wherein a first diameter of a space opened by the first orifice is greater than a second diameter of a space opened by the second orifice.

11. The ejector having the two-stage nozzle structure of claim 1, further comprising:
a spring disposed to surround a surface of the poppet;
a protrusion protruding from the inner surface of the housing; and
a guide member disposed on the surface of the poppet to guide a position of the poppet in the housing,
wherein the spring is disposed between the protrusion and the guide member.

* * * * *